United States Patent
Huotari

(10) Patent No.: US 9,856,351 B2
(45) Date of Patent: Jan. 2, 2018

(54) METHOD AND ARRANGEMENT FOR CROSS-LINKING OR VULCANIZING AN ELONGATE ELEMENT

(71) Applicant: MAILLEFER S.A., Ecublens (CH)

(72) Inventor: Pekka Huotari, Kotalahti (FI)

(73) Assignee: MAILLEFER S.A., Ecublens (CH)

( * ) Notice: Subject to any disclaimer, the term of this patent is extended or adjusted under 35 U.S.C. 154(b) by 0 days.

(21) Appl. No.: 15/046,060

(22) Filed: Feb. 17, 2016

(65) Prior Publication Data
US 2016/0237226 A1 Aug. 18, 2016

(30) Foreign Application Priority Data
Feb. 18, 2015 (FI) ...................................... 20155106

(51) Int. Cl.
*B05D 3/02* (2006.01)
*C08J 3/24* (2006.01)
(Continued)

(52) U.S. Cl.
CPC ............... *C08J 3/247* (2013.01); *B29C 35/02* (2013.01); *B29C 35/0222* (2013.01); *B29C 47/0016* (2013.01); *C09D 201/00* (2013.01); *H01B 13/14* (2013.01); *H01B 13/145* (2013.01); *H01B 19/04* (2013.01); *B29C 47/0014* (2013.01); *B29C 47/025* (2013.01); *B29C 47/8805* (2013.01); *B29C 47/889* (2013.01);
(Continued)

(58) Field of Classification Search
CPC ......... B05D 3/0272; F26B 7/20; F26B 13/002
See application file for complete search history.

(56) References Cited

U.S. PATENT DOCUMENTS 1,722,797 A * 7/1929 Jessup ...................... B01J 19/00
118/DIG. 22
4,080,131 A 3/1978 Bahder et al.
(Continued)

FOREIGN PATENT DOCUMENTS

EP 2574439 A1 4/2013
EP 2755211 A1 7/2014
(Continued)

OTHER PUBLICATIONS

Jul. 6, 2016 Extended European Search Report issued in European Patent Application No. 16155795.4.
(Continued)

*Primary Examiner* — Robert B Davis
(74) *Attorney, Agent, or Firm* — Oliff PLC

(57) ABSTRACT

The invention relates to a method and arrangement of crosslinking or vulcanizing an elongate element, the method including an extrusion step in which a conductor element is coated by a layer of crosslinkable synthetic material and a crosslinking step in which crosslinking reaction is carried out after the extrusion step. The crosslinking reaction is carried out at first in a first heating zone by heating by heating the coated conductor element in a temperature of 550 degrees Celsius or higher. The first heating zone is located downstream of the extrusion step. After the first heating zone the crosslinking reaction is carried further by heating the coated conductor in a temperature of 200-300 degrees Celsius in a second heating zone.

12 Claims, 3 Drawing Sheets

Figure 1:
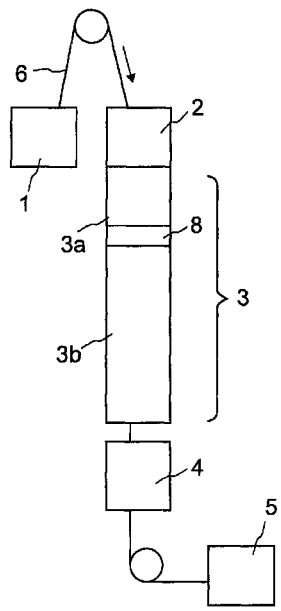

(51) Int. Cl.
*C09D 201/00* (2006.01)
*H01B 19/04* (2006.01)
*H01B 13/14* (2006.01)
*B29C 47/00* (2006.01)
*B29C 35/02* (2006.01)
*B29C 47/02* (2006.01)
*B29C 47/88* (2006.01)
*B29L 31/34* (2006.01)
*B29K 105/24* (2006.01)

(52) U.S. Cl.
CPC ...... *B29C 47/8835* (2013.01); *B29K 2105/24* (2013.01); *B29L 2031/3462* (2013.01); *C08J 2300/12* (2013.01)

(56) References Cited

U.S. PATENT DOCUMENTS

| | | | |
|---|---|---|---|
| 4,234,624 A | 11/1980 | Linderoth et al. | |
| 4,372,898 A * | 2/1983 | Menges | B29C 35/12 264/474 |
| 4,752,217 A * | 6/1988 | Justus | C21D 9/5732 432/59 |
| 5,302,411 A * | 4/1994 | Toth | B05D 3/0272 427/120 |
| 6,186,089 B1 * | 2/2001 | Le Tiec | B05D 3/0272 118/67 |
| 2004/0234640 A1 * | 11/2004 | Jung | H01B 13/14 425/131.1 |
| 2007/0101657 A1 | 5/2007 | Okajima et al. | |
| 2015/0013177 A1 * | 1/2015 | Villella, III | B05D 3/0209 34/269 |

FOREIGN PATENT DOCUMENTS

| | | |
|---|---|---|
| GB | 586 209 A | 3/1947 |
| GB | 1359836 A | 7/1974 |
| GB | 2017564 A | 10/1979 |

OTHER PUBLICATIONS

Anonymous., "Power Cables With Extruded Insulation for Rated Voltages up to 230 kV". TF Kable, pp. 1-9, 2004.

Aug. 10, 2015 Search Report issued in Finnish Patent Application No. 20155106.

* cited by examiner

METHOD AND ARRANGEMENT FOR CROSS-LINKING OR VULCANIZING AN ELONGATE ELEMENT

The invention relates to a method of cross-linking or vulcanizing an elongate element, the method comprising an extrusion step in which a conductor element is coated by a layer of cross-linkable synthetic material and a cross-linking step in which cross-linking reaction is carried out after the extrusion step. The invention relates also to an arrangement for cross-linking or vulcanizing an elongate element.

The present invention relates to a method and arrangement used in the manufacturing process of electrical cables, especially high and extra high voltage cables (MV, HV and EHV cables). These cables are mainly plastic insulated and cross-linked in Continuous Vulcanization lines (CV lines). The Continuous Vulcanization lines discussed above can be either dry curing catenary CV lines (CCV lines) or vertical continuous vulcanization lines (VCV lines).

The core of the cable consists of a conductor element (AL or CU, 35 . . . 3500 mm$^2$) and three insulating layers (inner semiconductive 0.5 . . . 2 mm, insulation 3.5 . . . 35 mm and outer semiconductive 0.5 . . . 2 mm).

The curing of the cable is achieved in a pressurized tube (CV-tube) at a pressure of ca 10 bar, with an inner diameter 200 . . . 300 mm and a length of 100 . . . 200 m. Cross-linking of the layers takes place in the first section of the CV-tube in nitrogen atmosphere. In order to activate the cross-linking chemical reaction, the insulation layers are heated to elevated temperature (200 . . . 300° C.). This elevated temperature creates also thermal expansion.

The matters discussed above are well known to a person skilled in the art, and therefore operation or/and construction of the continuous vulcanization lines is not described in detail here. As an example of the prior art documents in which the technique relating to continuous vulcanization lines are described EP 2 574 439 A1 can be mentioned.

Problems of the prior art relate to core roundness or actually lack thereof. In other words when using the technique of the prior art the result, i.e. the cross section of the cable is not always completely round but for example oval or some other form.

Lack of roundness of the core can be generally categorized into the following categories namely:
flatness near the insulation layer seams
general oval shape
drooping (in CCV-lines)
irregular shape due to flow distributor The first three categories are those which are the most important. Drooping is obviously not an issue in vertical vulcanization lines. The flow distribution of the insulation layer is good enough not to cause any measurable roundness error. Therefore both the flatness and the oval shape develop during the cross-linking phase.

The object of the present invention is to eliminate the problems of the prior art. This is obtained by the present invention. The method of the invention is characterized in that the cross-linking reaction is carried out at first in a first heating zone by heating by heating the coated conductor element in a temperature of 550 degrees Celsius or higher, the first heating zone being located downstream of the extrusion step, and after the first heating zone the cross-linking reaction is carried further by heating the coated conductor in a temperature of 200-300 degrees Celsius in a second heating zone. The arrangement of the invention is characterized in that the cross-linking reaction is arranged to be carried out at first in a first heating zone by heating by heating the coated conductor element in a temperature of 550 degrees Celsius or higher, the first heating zone being located downstream of the extrusion head, and after the first heating zone the cross-linking reaction is arranged to be carried further in a second heating zone by heating the coated conductor in a temperature of 200-300 degrees Celsius.

An advantage of the invention is in that it solves the problems of the prior art discussed above.

Figure 2:
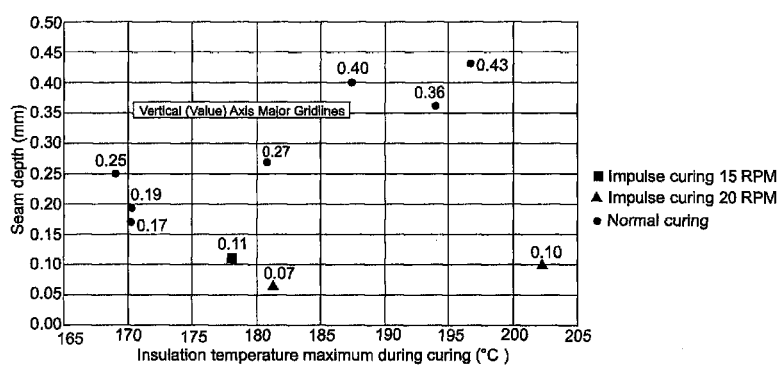
Figure 3:
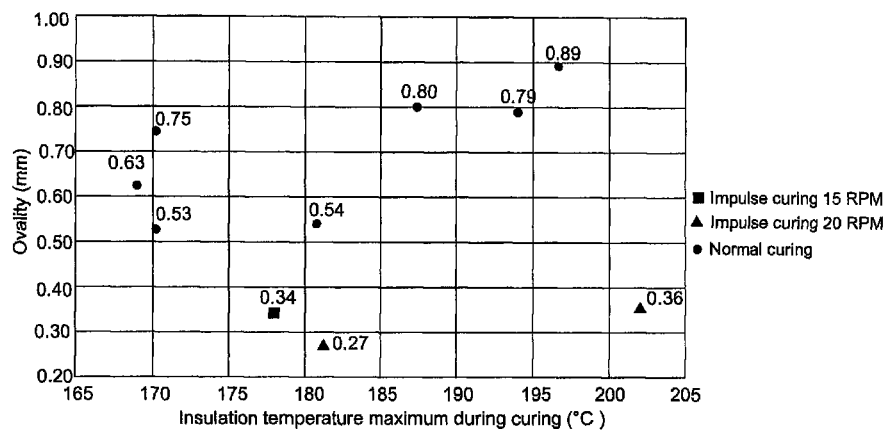
Figure 4:
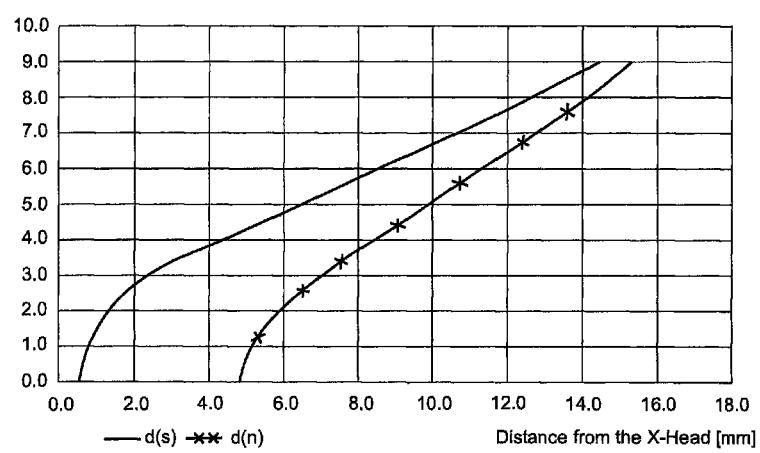
Figure 5:
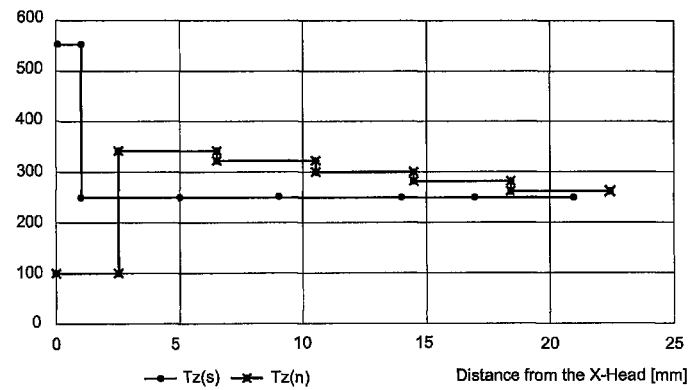
Figure 6:
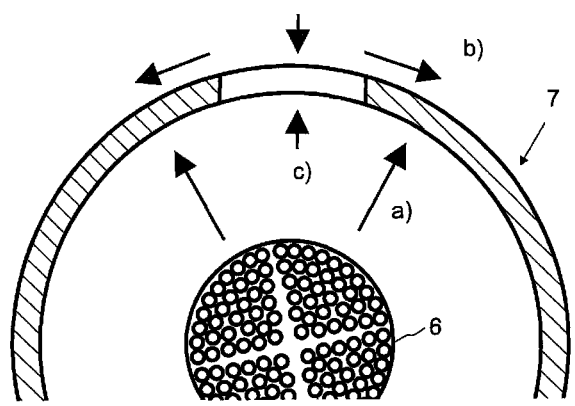

In the following the invention will be described in greater detail with reference to the attached drawing, whereby FIG. 1 shows a principle layout of a vertical continuous vulcanization line, FIG. 2 shows influence of the curing of the invention on flatness (seam depth) when compared to the curing of the prior art, FIG. 3 shows influence of the curing of the invention on oval shape when compared to the curing of the prior art, FIG. 4 shows cross-linking penetration depth obtained by the invention and the prior art, FIG. 5 shows heating zone profiles of the invention and the prior art, and FIG. 6 show expanding situation in a cross-linking process seen in a cross-section of a cable.

The invention is described by using a vertical continuous vulcanization line as an example. FIG. 1 shows a principle layout of a vulcanizing line, especially a vertical continuous vulcanization line (VCV line). The line shown comprises a payoff 1, an extrusion head arrangement 2, a vulcanization tube 3, a cooling tube 4 and a take up 5. The conductor is guided from the payoff to the take up 5 through the line. FIG. 1 shows only the most basic elements of the line. When looking at FIG. 1 a person skilled in the art immediately realizes that the line may also comprise further elements, i.e. a preheater for a conductor element, a postheater, and metering capstans or metering caterpillars etc. As said earlier operation and structure of the line shown in FIG. 1 is well-known to a person skilled in the art and therefore said matters are not described in detail here. These matters have been described widely in the prior art, for example in EP 2 574 439 referred to earlier.

In a VCV-line, the structure enclosing the cable is radially symmetric, hence asymmetric phenomena creating roundness errors are to be found in the layers themselves, especially in the insulation layer. Asymmetric effects are a combination of
asymmetric temperature
mechanical weakness of the seams
molecular orientation
mechanical stresses
inhomogeneity None of these effects is strong enough to cause roundness errors in the case where the cable is simply cooled down without cross-linking. The roundness errors stem from the internal forces and displacement (both radial and tangential) that occur when the core is thermally expanded during cross-linking. Increased thermal expansion results in increased roundness error. Mechanical weakness (less molecular entanglement compared to the rest of the plastic layer) in the seam area causes a flat area (i.e. reduced thickness). The relationship between the oval shape and other asymmetry effects is less obvious.

The idea of the invention is to cross-link the surface layer up to certain penetration depth of the core using a short curing first heating zone 3a with exceptionally high temperature. The invention can quite well be described by using the term "impulse curing". In a full-size CV-line this particular first heating zone 3a would be located right downstream of the cross-head or extrusion arrangement 2 (for example immediately after the cross-head or extrusion arrangement 2), with a length of 0.5-4 m and set at a temperature 550° C. or higher. After said first heating zone 3a curing process is continued by heating the core in a second heating zone 3b at a lower temperature of 200-300 degrees Celsius.

According to state of the art process setup, the cable surface temperature should not exceed 300° C. This limitation is not applicable for impulse curing because thermal degradation of the surface is a function of both time exposure and temperature; with EEA (ethylene ethyl acrylate) and EBA (ethylene-butyl acrylate) based semiconductive materials, a much higher temperature is acceptable.

The cross-linking induced early on by impulse curing strengthens the surface of the seam area, where the influence of thermal expansion is strongest (FIG. 2). It also fixes the original round shape (FIG. 3). It is crucial to apply impulse curing in the very beginning of the crosslinking phase, before thermal expansion.

Penetration depth is defined the distance, from the outer surface, where the crosslinking degree exceeds 80%. FIG. 4 compares calculated penetrations depths along the CV tube in terms of penetrations depth for the standard prior art process d(n) and for impulse curing d(s).

The calculation was done for an identical cable as reported in FIG. 2 and FIG. 3 (Aluminum conductor $D_c$=50.0 mm, outside diameter $D_o$=98.0 mm). It is obvious that impulse curing leads to a significant layer of cross-linked material early on, conferring strength to the outside of the insulation to withstand the stresses related to thermal expansion. As an example, the penetration depth is almost double at a length of 7 m, where significant expansion starts to develop.

The calculated thermal expansion of the total layer thickness (all three layers) amounts to 2.2% with impulse curing and to 2.6% with normal curing. The corresponding heating profiles are shown in FIG. 5 showing heating zone profile Tz(s) for impulse heating, and heating zone profile for normal curing Tz(n).

FIG. 5 shows also how the heating is carried out at a lower temperature after the first heating zone 3a in the second heating zone 3b. In this example, a short passive and neutral "splice box" 8 connecting the extrusion head to the CV tube is used. The length of the splice box can be for example 2.5 m.

The first heating zone 3a can be located either upstream or downstream of the splice box 8 in vertical continuous vulcanization lines. FIG. 1 shows the upstream position of the first heating zone, i.e. the first heating zone 3a is located before the splice box 8 when seeing in the moving direction of the core 6. In the downstream position the first heating zone 3a is located after the splice box when seeing in the moving direction of the core 6. The point here is that the surface layer extruded is cross-linked before thermal expansion becomes significant. In catenary vulcanization lines the situation is different because of drooping. For said reason in catenary vulcanization lines the first heating zone 3a must be placed as close to the extrusion head 2 as possible, i.e. upstream of the splice box 8.

The reason why the present invention, i.e. impulse curing, improves roundness and reduce flatness can be described shortly as follows by looking at FIG. 6 showing a cross section of a cable. Conductor is shown with a reference number 6 and semiconductive and insulation material is shown with a reference 7 in FIG. 6.

The origin of flatness is tangential displacement of outer semiconductive and insulation material. A seam (weld line) has weaker melt strength compared to the rest of the insulation/semicon. Normally, when inner parts are expanding (see FIG. 6, expansion a), the circumference increases. Since the seam area is weaker, it stretches tangentially (FIG. 6, stretching b) and gets thinner (FIG. 5 thinning c). The described mechanism takes place first near the surface and then penetrates and weakens towards the conductor.

With impulse curing the fast cross-linking of the circumference before significant thermal expansion strengthens the seam area and reduces significantly the flatness.

The invention has been described above by using the embodiment show in the figures. The embodiment shown is however by no means intended to restrict the invention but the invention may be varied completely freely within the scope of the claims. The embodiment shown relate to a vertical continuous vulcanization line (VCV line). The invention is however not restricted to VCV lines but the invention can well be used also in connection with continuous catenary CV lines (CCV lines) etc.

The invention claimed is:

1. A method of cross-linking or vulcanizing an elongate element, the method comprising:
   an extrusion step in which a conductor element is coated by a layer of crosslinkable synthetic material; and
   a crosslinking step in which a crosslinking reaction is carried out after the extrusion step,
   wherein the crosslinking reaction is carried out at first in a first heating zone by heating the coated conductor element at a temperature of 550 degrees Celsius or higher, the first heating zone being located downstream of the extrusion step, and after the first heating zone the crosslinking reaction is further carried out by heating the coated conductor at a temperature of 200-300 degrees Celsius in a second heating zone.

2. The method as claimed in claim 1, wherein heating in the first heating zone is carried out upstream of a passive splice box connecting the extruder step to the second heating zone.

3. The method as claimed in claim 1, wherein heating in the first heating zone is carried out downstream of a passive splice box connecting the extruder step to the second heating zone.

4. The method as claimed in claim 1, wherein the first heating zone has a length of 0.5-4 m.

5. The method as claimed in claim 1, wherein the method is carried out in a Vertical Continuous Vulcanization line (VCV-line).

6. The method as claimed in claim 1, wherein the method is carried out in a Catenary Continuous Vulcanization line (CCV-line).

7. An arrangement comprising:
   an extrusion head configured to coat an elongate element with a layer of crosslinkable synthetic material; and
   a vulcanization tube located downstream of the extrusion head and configured to crosslink the crosslinkable synthetic material, the vulcanization tube comprising:
   a first heating zone configured to heat the coated elongate element at a temperature of 550 degrees Celsius or higher; and
   a second heating zone located downstream of the first heating zone and configured to heat the coated elongate member at a temperature of 200-300 degrees Celsius.

8. The arrangement as claimed in claim 7, further comprising:

a passive splice box connecting the extrusion head to the vulcanization tube, wherein the first heating zone is located between the extrusion head and the passive splice box.

9. The arrangement as claimed in claim 7, further comprising:

a passive splice box connecting the extrusion head to the vulcanization tube, wherein the first heating zone is located between the passive splice box and the second heating zone.

10. The arrangement as claimed in claim 7, wherein the first heating zone has a length of 0.5-4 m.

11. A vertical continuous vulcanization line comprising the arrangement as claimed in claim 7.

12. A catenary continuous vulcanization line comprising the arrangement as claimed in claim 7.

* * * * *